United States Patent
Zou et al.

(10) Patent No.: US 9,398,025 B2
(45) Date of Patent: Jul. 19, 2016

(54) METHOD FOR GENERATING AND CHECK-CONTROLLING NETWORK IDENTITY INDENTIFICATION CODE IN NETWORK ELECTRONIC IDENTIFICATION CARD

(71) Applicant: THE THIRD INSTITUTE OF THE MINISTRY OF PUBLIC SECURITY, Shanghai (CN)

(72) Inventors: Xiang Zou, Shanghai (CN); Minghui Yang, Shanghai (CN); Zeming Yan, Shanghai (CN); Bo Jin, Shanghai (CN); Yixin Xu, Shanghai (CN); Lishun Ni, Shanghai (CN); Yongtao Hu, Shanghai (CN); Jingjing Yao, Shanghai (CN)

(73) Assignee: THE THIRD INSTITUTE OF THE MINISTRY OF PUBLIC SECURITY, Shanghai (CN)

( * ) Notice: Subject to any disclaimer, the term of this patent is extended or adjusted under 35 U.S.C. 154(b) by 36 days.

(21) Appl. No.: 14/370,019
(22) PCT Filed: Sep. 28, 2012
(86) PCT No.: PCT/CN2012/082234
§ 371 (c)(1),
(2) Date: Jun. 30, 2014
(87) PCT Pub. No.: WO2013/097508
PCT Pub. Date: Jul. 4, 2013

(65) Prior Publication Data
US 2014/0331291 A1 Nov. 6, 2014

(30) Foreign Application Priority Data
Dec. 29, 2011 (CN) .......................... 2011 1 0451982

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| G06F 21/34 | (2013.01) | |
| H04L 9/32 | (2006.01) | |

(52) U.S. Cl.
CPC .............. *H04L 63/126* (2013.01); *G06F 21/34* (2013.01); *H04L 9/3226* (2013.01); *H04L 63/0853* (2013.01); *H04L 63/10* (2013.01); *H04L 9/3234* (2013.01)

(58) Field of Classification Search
USPC ............................................................ 726/4
See application file for complete search history.

(56) References Cited

U.S. PATENT DOCUMENTS

| | | | |
|---|---|---|---|
| 2006/0075255 A1* | 4/2006 | Duffy ...................... | G06F 21/32 713/186 |
| 2010/0185868 A1* | 7/2010 | Grecia .................. | H04L 9/3234 713/176 |

FOREIGN PATENT DOCUMENTS

| | | |
|---|---|---|
| CN | 1395776 A | 2/2003 |
| CN | 102255732 A | 11/2011 |
| CN | 102420834 A | 4/2012 |

OTHER PUBLICATIONS

Qiong Lui; Digital Rights Management for Content Distribution; Year 2003; Citeseer; p. 1-10.*

*Primary Examiner* — Monjour Rahim
(74) *Attorney, Agent, or Firm* — Avery N. Goldstein; Blue Filament Law PLLC

(57) ABSTRACT

A method for generating and check-controlling a network identity identification code in a network electronic identity is provided for the establishment of a unified network identity management and service ecosystem that effectively protects the network application security and identity information privacy of citizens. A server performs initialization and generates and distributes random numbers while receiving and auditing a request to generate a network identity identification code from a client. If the client passes the audit, encryption coding is performed and a network identity identification code is generated and sent to a network electronic identification card through the client. The network electronic identification card performs check processing of the network identity identification code, and feeds back a result to the server. The server stores the network identity identification code into a database, and informs the user.

22 Claims, 2 Drawing Sheets

METHOD FOR GENERATING AND CHECK-CONTROLLING NETWORK IDENTITY INDENTIFICATION CODE IN NETWORK ELECTRONIC IDENTIFICATION CARD

FIELD OF TECHNOLOGY

The present invention relates to the field of identity management and information security, especially to the technical field of identity identification and management in the Internet network environment, in particular to a method for generating and check-controlling a network identity identification code in a network electronic identity.

DESCRIPTION OF RELATED ARTS

With the network infrastructure and application rapidly developing in various countries all over the world, the social development and operation in each country has been closely connected with the network, and has been more and more dependent on the information network. According to the 29th survey report released by CNNIC in January 2012, up to the end of December 2011, the netizen scale in our country had broken through the population of 500 million and reached 513 million people, which became the highest in the world, and the penetration was up to 38.3%, which was higher than the global average. The problems in real society will be more and more reflected in the 'network society', also the problems produced from 'network society' will more fully influence social reality. In the first half of 2011, 217 million netizens had encountered virus or Trojan attacks. Compared with the end of 2010, the number of victims had increased 7.35 million and the rate is 44.7%. In the meantime, in the first half of 2011, 121 million netizens, 24.9% of the total netizens, had had the experience of having their account or password stolen. The number of victims had increased 21.07 million people in the six months and had increased 3.1% from the end of 2010. The problem of network security and integrity has become one of the most important problems which influence the development of the Internet in our country.

The implementation of network identity management, in terms of the whole social public field, can effectively curb the flooding phenomenon of false information and bad information caused by the virtual abuse of Internet; in terms of the service of the people's livelihood, can provide social public services and convenience for citizens; in terms of business services, can provide a variety of e-commerce services and solve the problem of the network transaction integrity, has become the urgent demand of our social harmonious development. Accurate identification which is able to identify the real identity of citizens is needed to realize the network identity management. Electronic Identity (eID) is the network electronic identity which is based on the existing citizen identity management system, based on the cryptography, carried by smart card chip, uniformly issued for citizens to confirm remote identity on the Internet by public security organs, and with the characteristics of authority, consistency and universality.

The mainly forms of the existing network identity identification code are:

(1) Custom username (generally in an alphanumerical form), email address (form as xx@xxx.xxx) and etc, which have no internal connection with personal identity and are easy to steal or abuse;

(2) Directly using name or identification numbers as the identification code, which is easy to expose personal identity privacy. For example, there are a variety of personal digital certifications which are issued by the digital certification center and these personal digital certifications normally use personal identity information (such as name and identification numbers) directly as the subject of personal digital certifications.

SUMMARY OF THE INVENTION

Aspects of the present invention generally provide a method for generating and check-controlling a network identity identification code in a network electronic identity which effectively achieves the purposes of both network identity management and privacy protection, is convenient to interconnect among the different identity service systems, protects the network application security, is quick and convenient in use, has stable and reliable working performance, and has a wide application range, to overcome the shortcomings in the above existing technology.

To achieve the above purposes, the present invention, a method for generating and check-controlling a network identity identification code in a network electronic identity, is as follows:

The method for generating and check-controlling a network identity identification code in a network electronic identity, in which the network electronic identity is connected with a server through a client, characterized in that, further comprises the following steps:

(1) The server performing initialization, and performing generation and distribution of random numbers in advance;

(2) The server receiving a request from a client to generate a network identity identification code, and extracting the user's identity information from this;

(3) The server auditing and processing the identity information;

(4) If the auditing is not passed, then performing information tips and exiting;

(5) If the auditing is passed, then performing encryption coding to achieve a coded value according to the identity information and the corresponding random number;

(6) The server generating a network identity identification code according to the coded value, and sending the network identity identification code to the network electronic identity through the client;

(7) The network electronic identity achieving the request of writing the network identity identification code transmitted by the client, performing the check processing operation of the network identity identification code, and feeding back a result to the server through the client;

(8) The server judging whether it receives the information that the network identity identification code has been successfully written into the network electronic identity transmitted by the client;

(9) If it is not received, then performing information error tips and exiting;

(10) If it is received, then the server storing the network identity identification code into a database, and informing the user.

In the method for generating and check-controlling a network identity identification code in a network electronic identity, performing generation and distribution of random numbers in advance comprises the following steps:

(11) The server generating the random numbers through a true random number generator (TRNG);

(12) The server using the random numbers as the serial number information of the card to be directly written into the corresponding network electronic identity;

(13) The server achieving the identity information of the user who holds the network electronic identity and establishing the corresponding relationship between the identity information of the user and random number.

In the method for generating and check-controlling a network identity identification code in a network electronic identity, the random number is 128 bytes long.

In the method for generating and check-controlling a network identity identification code in a network electronic identity, the identity information of the user comprises the version of the identity identification code, the user's identity number, the username and the valid certificate types.

In the method for generating and check-controlling a network identity identification code in a network electronic identity, the valid certificate types comprise the resident identity card, the household register, the Chinese passport, the army identity card, the soldier license, the officers card, the Exit-Entry Permit for Travelling to and from Hong Kong and Macao (the Two-way Permit), the Taiwan compatriot permit, foreign passports and other certificates.

In the method for generating and check-controlling a network identity identification code in a network electronic identity, auditing and processing the identity information comprise the following steps:

(31) The server judging whether the user's identity information has generated the corresponding valid network identity identification code;

(32) If so, then returning the failed audit result;

(33) If not, then returning the successful audit result.

In the method for generating and check-controlling a network identity identification code in a network electronic identity, performing information tips includes:

Sending the information tip, "the user's audit is failed and has applied for a network identity identification code", to the user.

In the method for generating and check-controlling a network identity identification code in a network electronic identity, performing encryption coding to achieve a coded value comprises the following steps:

(51) Producing an original string according to the following formula:

Original string=append (user's identity number, username, valid certificate types and random number), in which the append is the string concatenation operator;

(52) Getting a hash value by padding, iterating and compressing the original string with the default encryption algorithm;

(53) Getting a coded value by coding the hash value with the default coding rule.

In the method for generating and check-controlling a network identity identification code in a network electronic identity, the encryption algorithm is SM3 cryptographic hash algorithm or SHA256 encryption algorithm.

In the method for generating and check-controlling a network identity identification code in a network electronic identity, the hash value is a piece of 32-byte-long binary information.

In the method for generating and check-controlling a network identity identification code in a network electronic identity, the coding rule is Base64 coding.

In the method for generating and check-controlling a network identity identification code in a network electronic identity, the coded value is a 44-byte-long string.

In the method for generating and check-controlling a network identity identification code in a network electronic identity, generating a network identity identification code according to the coded value includes:

Generating a network identity identification code according to the following formula:

Network identity identification code=append (version number of the network identity identification code, coded value, reservation byte), in which the append is the string concatenation operator.

In the method for generating and check-controlling a network identity identification code in a network electronic identity, the reservation byte is a 3-byte-long string, and its default is 0.

In the method for generating and check-controlling a network identity identification code in a network electronic identity, the check processing operation of the network identity identification code comprises the following steps:

(71) The electronic identity performing initialization and reading the user's identity information and the serial number information of the card;

(72) The network electronic identity judging in real time whether it receives the request sent by the client of writing the network identity identification code in;

(73) If not, then repeating the above step (72);

(74) If so, then reading the coded value of the network identity identification code, and performing encryption coding to get a coded value of the card according to the user's identity information and the serial number information of the card.

(75) The network electronic identity performing consistency checking between the coded value and the coded value of card;

(76) If the checking is passed, then writing the network identity identification code in and returning the result that the network identity identification has been successfully written in; if the checking is not passed, then returning directly the result that the network identity identification has been failed in written in.

In the method for generating and check-controlling a network identity identification code in a network electronic identity, performing encryption coding to get the coded value of the card comprises the following steps:

(741) Producing an original string of the card according to the following formula:

Original string of the card=append (user's identity number, valid certificate types and the serial number information of card), in which the append is the string concatenation operator;

(742) Getting the hash value of the card by padding, iterating and compressing the original string of the card with the default encryption algorithm of the card;

(743) Getting a coded value of the card by coding the hash value of the card with the default coding rule of the card.

In the method for generating and check-controlling a network identity identification code in a network electronic identity, the default encryption algorithm of the card can be SM3 cryptographic hash algorithm or SHA256 encryption algorithm.

In the method for generating and check-controlling a network identity identification code in a network electronic identity, the hash value of the card is a piece of 32-byte-long binary information.

In the method for generating and check-controlling a network identity identification code in a network electronic identity, the coding rule of the card is Base64 coding.

In the method for generating and check-controlling a network identity identification code in a network electronic identity, the coded value of the card is a 44-byte-long string.

In the method for generating and check-controlling a network identity identification code in a network electronic identity, performing consistency checking comprises the following steps:

(751) The network electronic identity performing bit comparison between the coded value and the coded value of the card;

(752) If they are fully identical with each other, then returning the successful audit result;

(753) If they aren't fully identical with each other, then returning the failed audit result.

In the method for generating and check-controlling a network identity identification code in a network electronic identity, performing information error tips includes:

The server sending information tips, "the network identity identification is failed to be generated", to the client.

By means of the method for generating and check-controlling a network identity identification code in a network electronic identification card, for the reason that the coding method is that the Base64 coding of the 32-byte-long binary information is calculated with the user's identity number, the username and the 128-byte-long random number string, this method has the characteristics of uniqueness, low-cost calculation and irreversibility and achieves the purposes of both network identity management and privacy protection. At the same time, there is a one-to-one correspondence between the network identity identification code (eID_code), representing the identification code of citizenship corresponding to the eID, and the citizenship. The eID_code itself doesn't include any user's identity information, which ensures the personal identity's authenticity and effectively protects the identity information from being exposed. On the other hand, the present invention analyzes the different identity information in the network identity management and service to give the unified rule of the eID_code coding method and on this account to approve, exchange, preserve and manage the identity information. This is convenient to interconnect among the different identity service systems, and effectively protects the network application security and identity information privacy of citizens. The method is convenient and quick in use, has stable and reliable working performance, and has a wide application range, thereby laying a strong foundation for the establishment of unified network identity management and service ecosystem.

DETAILED DESCRIPTION OF THE PREFERRED EMBODIMENT

The present invention is further exemplified hereinafter by reference to the following embodiments to make the technical content of the present invention understood clearly.

Figure 1:
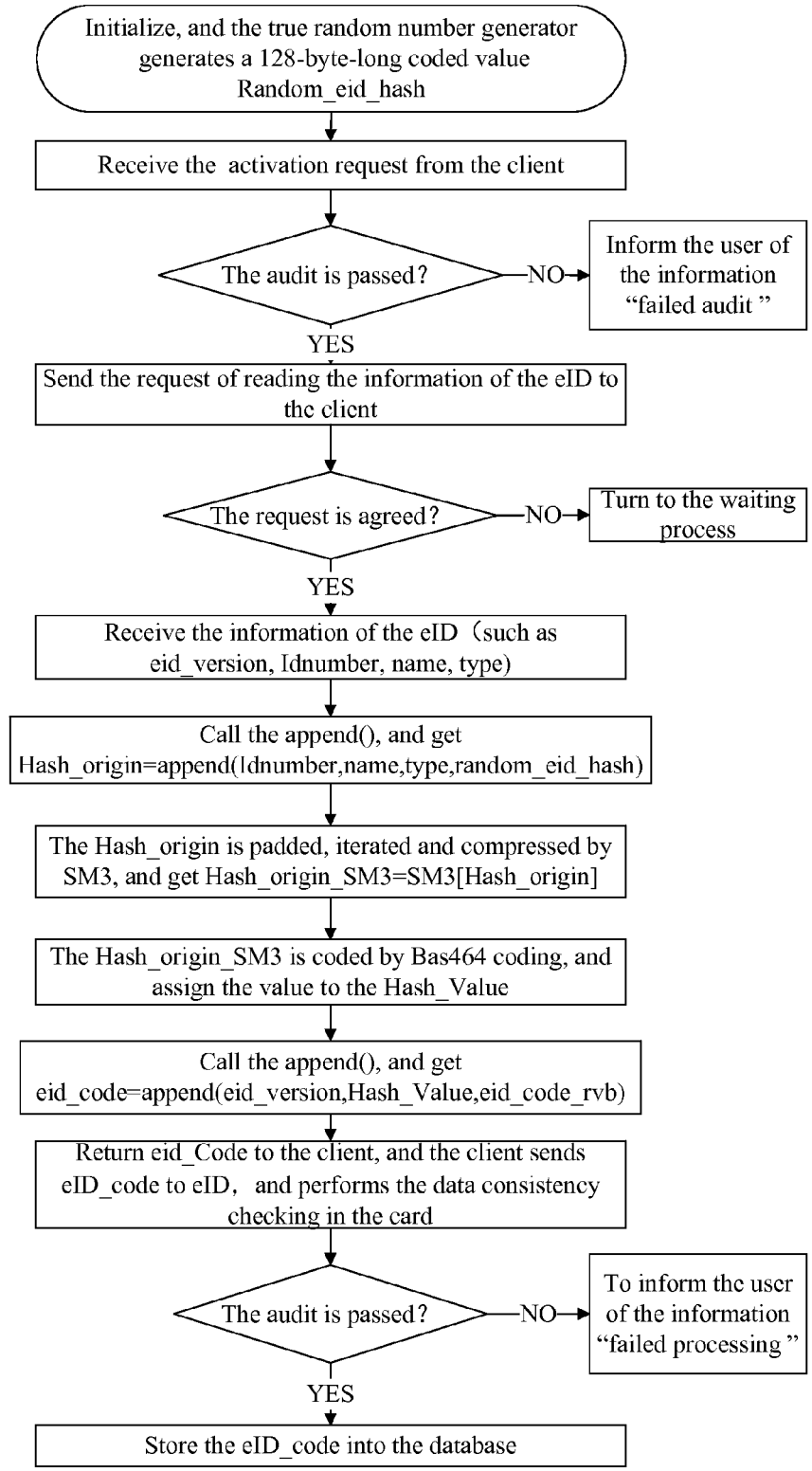
FIG. 1 is a flowchart illustrating the overall process of the method for generating and check-controlling a network identity identification code in a network electronic identity of the present invention.
Figure 2:
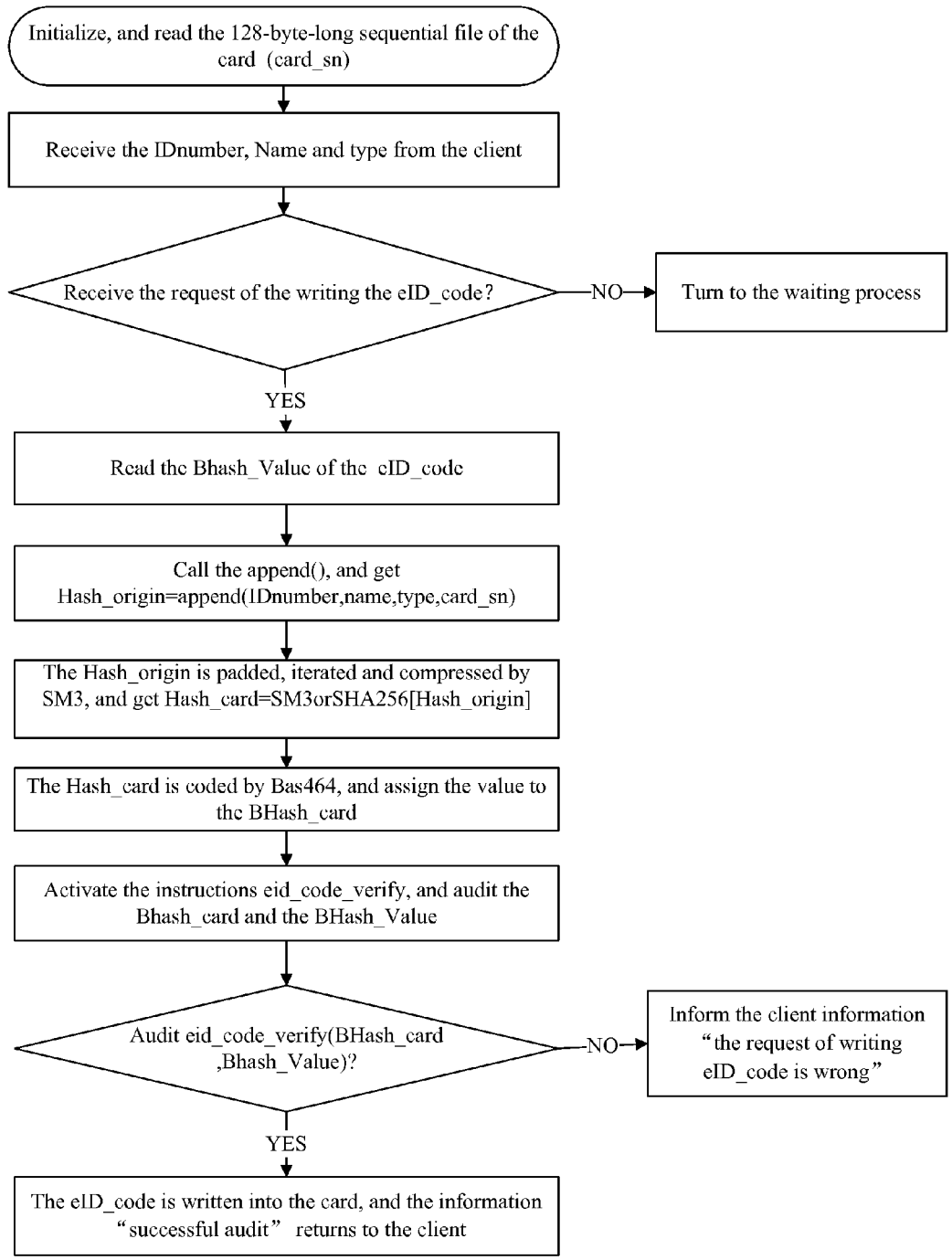
FIG. 2 is a flowchart illustrating the check processing operation of a network identity identification code in the method for generating and check-controlling a network identity identification code in a network electronic identity of the present invention.

Referring to FIGS. 1 and 2, the method for generating and check-controlling a network identity identification code in a network electronic identity, in which the network electronic identity is connected with a server through a client, characterized in that, the method further comprises the following steps:

(1) The server performing initialization, and performing generation and distribution of random numbers in advance, comprises the following steps:
 (a) The server generating the random numbers through a true random number generator (TRNG); the random numbers are 128-byte-long.
 (b) The server using the random numbers as the serial number information of the card to be directly written into the corresponding network electronic identity;
 (c) The server achieving the identity information of the user who holds the network electronic identity and establishing the corresponding relationship between the identity information and random number; the identity information comprises the version number of the network identity identification code, the user's identity number, the username and the valid certificate types; the valid certificate types comprise the resident identity card, the household register, the Chinese passport, the army identity card, the soldier license, the officers card, the Exit-Entry Permit for Travelling to and from Hong Kong and Macao (the Two-way Permit), the Taiwan compatriot permit, foreign passports and other certificates;

(2) The server receiving a request from a client to generate a network identity identification code, and extracts the user's identity information from this;

(3) The server auditing and processing the identity information, comprise the following steps:
 (a) The server judging whether the user's identity information has generated the corresponding valid network identity identification code;
 (b) If so, then returning the failed audit result;
 (c) If not, then returning the successful audit result;

(4) If the auditing is not passed, then performing information tips and exiting, in which performing information tips includes:

Sending the information tip, "the user's audit is failed and has applied for a network identity identification code" to the user;

(5) If the auditing is passed, then performing encryption coding to achieve a coded value according to the identity information and the corresponding random number, comprises the following steps:
 (a) Producing an original string according to the following formula:
  Original string=append (user's identity number, username, valid certificate types, random number), in which the append is the string concatenation operator;
 (b) Getting a hash value, a piece of 32-byte-long binary information, by padding, iterating and compressing the original string with the default encryption algorithm, which can be SM3 cryptographic hash algorithm), SHA256 encryption algorithm or others;
 (c) Getting a coded value, a 44-byte-long string, by coding the hash value with the default coding rule, which is Base64 coding;

(6) The server generating a network identity identification code according to the coded value, and sending the network identity identification code to the network electronic identity through the client, in which generating a network identity identification code according to the coded value includes:

Generating a network identity identification code according to the following formula:

Network identity identification code=append (version number of the network identity identification code, coded value, reservation byte), in which the append is the string concatenation operator and the reservation byte is a 3-byte-long string, and its default is 0;

(7) The network electronic identity achieving the request of writing the network identity identification code transmitted by the client in, performing the check processing operation of the network identity identification code, and feeding back a result to the server through the client, in which performing the check processing operation of the network identity identification code comprises the following steps:

(a) The electronic identity performing initialization and reading the user's identity information and the serial number information of the card;

(b) The network electronic identity judging in real time whether the request transmitted by the client of writing the network identity identification code in is received;

(c) If not, then repeating the above step (b);

(d) If so, then reading the coded value of the network identity identification code, and performing encryption coding to get the coded value of the card according to the user's identity information and the serial number information of card, comprises the following steps:

(i) Producing an original string of the card according to the following formula:

Original string of the card=append (user's identity number, valid certificate types and the serial number information of card), in which the append is the string concatenation operator;

(ii) Getting the hash value of the card, a piece of 32-byte-long binary information, by padding, iterating and compressing the original string of the card with the default encryption algorithm of the card, in which the default encryption algorithm of the card can be SM3 cryptographic hash algorithm, SHA256 encryption algorithm or other suitable encryption algorithm;

(iii) Getting a coded value of the card, a 44-byte-long string, by coding the hash value of the card with the default coding rule of the card, which the coding rule of the card is Base64 coding;

(e) The network electronic identity performing consistency checking between the coded value and the coded value of card, comprises the following steps:

(i) The network electronic identity performing bit comparison between the coded value and the coded value of the card;

(ii) If they are fully identical with each other, then returning the successful audit result;

(iii) If they are not fully identical with each other, then returning the failed audit result;

(f) If the checking is passed, then writing the network identity identification code in and returning the result that the network identity identification code has been successfully written in; if the checking is not passed, then returning directly the direct result that the network identity identification code has not been successfully written in;

(8) The server judging whether it receives the information that the network identity identification code is successfully written into the network electronic identity transmitted by the client;

(9) If it is not received, then performing information error tips and exit, in which performing information error tips includes:

The server sending information tips, "the network identity identification is failed to be generated", to the client;

(10) If it is received, the server storing the network identity identification code into a database, and informing the user.

In practice, the present invention mainly provides the coding method of the network identity identification code (eID_code) in a network electronic identity. There is no related solution in the present network identity management field.

The coding method of eID_code is the Base64 coding of the 32-byte-long binary information calculated by the user's identity number, the username and the 128-byte-long random number string, according to the 256-byte-long cryptographic hashing algorithm (national encryption SM3 or SHA256), having characteristics of uniqueness, low-cost calculation and irreversibility in order to achieve the purposes of network identity management and privacy protection.

There is a one-to-one correspondence between the network identity identification code (eID_code), representing the identification code of citizenship corresponding to the eID, and the citizenship. The eID_code itself doesn't include any user's identity information, which ensures the personal identity authenticity and effectively protects the identity information from being exposed. In the future, in the application of the eID in all industries and all fields, eID_code will be the only one identification code for the information/conversation in all kinds of application services. Therefore the coding method of the eID_code is the core link in the network identity management.

The present invention analyzes the different identity information in the network identity management and service to give unified eID_code coding rule and on this account to approve, exchange, preserve and manage the identity information. This is convenient to interconnect among the different identity service systems, protects the network application security and the citizen identity information privacy, and lays a strong foundation for establishment of unified network identity management and service ecosystem.

The present invention combines the needs of the network development situation and the network identity management. To carry out the network identity management in our country and provide the privacy information protection for citizens, the present invention raises a coding method of the network identity identification (eID_code), according to the 256-byte-long cryptographic hashing algorithm (national encryption SM3 or SHA256).

The present invention widely supports to solve the application which is related to the e-government, the e-commerce, the e-bank and the online payment carried by the eID.

Below are the definitions used in the present invention:

Network electronic identity (eID): The eID, the abbreviation of electronic identity, is the network electronic identity in the citizen identity management system. It is based on the cryptography, carried by smart card chip, and uniformly issued to citizens to confirm remote identity on the network by public security organs. It has the characteristics of authority, consistency and universality.

Network identity identification code (eID_code): There is a one-to-one correspondence between the eID_code, a network identity identification code, and citizenship. The eID_code itself doesn't include any user's identity information. The length of the eID_code is 48 bytes long, and the type of it is string, the numbers between each byte connecting with each other in turn and there being no blanks or any other characters (such as _, ~, `, \, /, &, etc).

SM3 algorithm—its full name is SM3 cryptographic hash algorithm. SM3 hash algorithm pads, iterates and compresses the message m, length of which is l ($l<2^{64}$) bits, to generate a hash value, length of which is 32 bytes long (256 bits).

SHA256—SHA (Secure Hash Algorithm) is a series of cryptographic hash function, designed by the National Security Agency (NSA) and released by the U.S. National Institute of Standards and Technology NIST). NIST released three additional SHA variants, and each variant has longer information abstract. They are named for their information length (measured by bits), added behind the old name: "SHA-256", "SHA-384" and "SHA-512". They were released in the draft FIPS PUB 180-2 in 2001, and then passed the audit and evaluation.

Base64 coding—According to the RFC2045 definition, Base64 is defined as that, the Base64 Content-Transfer-Coding is designed to represent arbitrary sequences of octets in a form that need not be humanly readable.

The coding object of the network identity identification (eID) is all the netizens who use network to go surfing inside the People's Republic of China. The coding method formats of network identity identification code (eID_code) are as follows:

(1) The coding format:

| eID_version | BHash_Value | eid_code_rvb |
|---|---|---|

The definitions are as follows:

eID_version: It means the version number of the eID, consuming one byte, and its type is string.

BHash_value: It means hash value, consuming 44 bytes, and its type is string. It is the Base64 coding of the 32-byte-long binary information calculated with the user's identity number (IDnumber), the username (name), the valid certificate type (type) and the 128-byte-long random number string (random_eid_hash), according to the national encryption SM3 (or SHA256) cryptographic hashing algorithm. It is named as BHash_Value. The computational formula is as follows:

$$BHash\_Value=Base_{64}\{(SM3|SHA256)[append\ (IDnumber\|name\|type\|random\_eid\_hash)]\} \quad (1)$$

The "valid certificate type" is as shown in Table 1.

eid_code_rvb: It means reservation byte, consuming three bytes, and its type is string. Its default is to be filled all with 0.

This is the computational formula of the eID_code as follows:

$$eID\_code=append\ (eID\_version\|BHash\_Value\|eID\_code\_rvb) \quad (2)$$

After the users have applied for the eID carrier through the relevant channels, they need to activate the carrier by the client in the network, and to obtain the network identity identification code (eID_code). The concrete generating steps are as follows:

Firstly, the server generating a 128-byte-long random number through a true random number generator (TRNG) in advance, and assigning the value to the string type variable random_eid_hash to generate the 3-byte-long reservation byte eid_code_rvb with the string type, and its default is to be filled with 0. When receiving the request to generate an eID_code from the client, the server will reading the version number eID_version, the user's identity number (IDnumber), the username (name) and the valid certificate types (type) from the request information.

Then, to ensure the uniqueness of the user's eID_code, the server will launching its audit procedures, and auditing whether the user has owned the valid eID before, which means having generated the valid eID_code. The server will refusing the user who has owned the valid eID to generate a new eID_code, and will informing the user of the information "failed audit and having applied for eID".

If the audit is passed, the server connecting the IDnumber, name, the type, the random_eid_hash to be padded, iterated and compressed with the SM3 (or SHA256 arithmetic), and generate a hash value of 32-byte-long binary information. Then the server performing Base64 coding to have a 44-byte-long string, and connecting the string, the eID_version and the eid_code_rvb to comprise the eID_code.

Finally, the server returning the eID_code to the client. If the return information is received that the client has successfully written the eID_code into eID, the server storing the eID_code into the database, and informing the user of a message that the eID_code can be checked; otherwise informing the client of the information "the eID_code is failed to be generated".

TABLE 1

| The valid certificate type | | |
|---|---|---|
| Number | Name | Description |
| 1 | Resident Identity Card | Chinese citizens who have reached the age of 16 and who reside in the People's Republic of China |
| 2 | Household Register | Chinese citizens who has not reached the age of 16 without civil capacity or with limited civil capacity and who reside in the People's Republic of China |
| 3 | Chinese Passport | Chinese passport holders whose passports are issued by the Ministry of Public Security or the Ministry of Foreign Affairs |
| 4 | Army Identity Card or Soldier License | The holders who have the Chinese people's liberation army identity cards or soldier licenses |
| 5 | Officers Card | The holders who have Chinese people's armed police force officers cards |
| 6 | Exit-Entry Permit for Travelling to and from Hong Kong and Macau (Two-way Permit) | The holders who have the mainland travel permit for Hong Kong and Macao residents |
| 7 | Taiwan Compatriot Permit | The holders who have the mainland travel permit for Taiwan residents |
| 8 | Foreign Passports | The holders who have the China travel permit for foreigners |
| 9 | Other Certificates | Such as the holders who have the organization certificates |

The proof technique of the network identity identification code is as follows:

(1) Initialization, reading the user's identity number (ID-number), the username (name), the valid certificate types (type) and the 128-byte-long sequential file of the card (card_sn).

(2) If the request of writing the eID_code into from the client is received, then reading the BHash_Value and turning to step 3, otherwise turning to the waiting process.

(3) Calling the connection function append( ), and making the string type variable Hash_origin=append (Idnumber, name, type, card_sn).

(4) The Hash_origin being padded, iterated and compressed by cryptographic hash algorithm SM3 (or SHA256) to generate a hash value of 32-byte-long binary information, and assigning the value to the Hash_card, which is:

Hash_card=(SM3|SHA256)[append (IDnumber||name||type||card_sn)]

(5) Encoding the Hash_card by Base64 coding to get a 44-byte-long string and assigning the value to the BHash_card, which is BHash_card=$Base_{64}${Hash_card}.

(6) Activating the data consistency checking instruction eid_code_verify in the card, and performing checking between BHash_carda and BHash_Value. If the result is identical, then agreeing the request of writing the eID_code in. If not, refusing the request of writing eID_code in and informing the user of the information that "the request of writing eID_code in is wrong".

After the user has applied for and activated the eID carrier with the valid certificates through the relevant channels, the eID_code in the relevant eID management system can be queried through the network.

TABLE 2

The examples of the eID_code in different certificates

| Name | Identity number | Certificate type | 128-byte-long random number | Hash value | eID_code |
|---|---|---|---|---|---|
| Zhong Huzhao | G20111109 | Chinese Passport | 548be952edd3cfdea4542bd3acb12b7 f61358071380c0270371c601a2d042b cb2999bfc085cc4610eec8264329ba4 8f0b5b71ceefd52439dc65827b6c311 b79574942c1fa4dbaa33054f67af0d3a de1eddbe0fe07b20cc5b5c91d04f4eb 60d652c9cdc85b9d6c1e1032cda438b a6270562806caace9df458021bba67a 2a6598c | sM1/V9ibxlF U5vtNEJbNg YwlqKp6g9j LQl2KxxS8d 8I= | 01sM1/V9ibxlF U5vtNEJbNgYw lqKp6g9jLQl2K xxS8d8I=0000 |
| Wang Junren | cannon0689413 | Army Identity Card | ebdb7b82a5170a17816d7f60325981c 0b46f5984c4d1997d20f4e7a7300e60 466ebff745d60d469aae3eaec41f9678 881a4fb1ab129125c0076b2562de59d cdcdb3d5c598008dc73e1781d72279a d332d9f4f7caa8875fa90107a5ab65f7 367ea47da852d4e91c4c5d3fc1af665 80dae58d51d341cc63dbb3ab3ae973b 31839e | G8nDL66zK FSfugFNLaK qTco3+AwJn +737cdtlGIii mo= | 01G8nDL66zKF SfugFNLaKqTc o3+AwJn+737c dtlGIiimo=0000 |
| Zhang Jing | 03001 | Armed police Card | 97b0e1bb74af48f499534cdbb2507ef 8bb489ea74f991a9491fbd94763277a 10328ae370fb0647e0d415e4703a337 57c09a8f4f1583fa8d1c7540211625ef fcee50564eede7218cfdeec8e66062d0 9b6ae3d4f33532c4ff5f577c8bdb04a5 c742fe6c6d7a24b549169cc6be1396e 2a17fc2b536cff61b22743ce7c137797 11ac | aIhi5Pz+oCk oOH2M+hDa UgzBBKoS4 8T3ZKrkdJnn njU= | 01aIhi5Pz+oCko OH2M+hDaUgz BBKoS48T3ZKr kdJnnnjU=0000 |
| Li Ao | D111109111 | Exit-Entry Permit for Travelling to and from Hong Kong and Macau | 26f31cd22a81b5985a5e4f548c3c2b9 6658b51af06af6d381f5b86536aa282 4e3e61a253cdce4eae15ba40dba3b69 6dcec77b85d6e7488e899e837195ce7 69203ff9d494b54bc0b4d12bba6e7cc f9f738b7ca93acabf2e16d4ce60ea1fb a87a7dd6a148a2e3b9abfe181abf0b7 54a16512a6b7fb79e545194ea7f1f88 8112b8f | EzUDkqY/N SsV1hds9F94 zP14qah+24+ MNZIxOJ9L/ Kk= | 01EzUDkqY/NS sV1hds9F94zP1 4qah+24+MNZI xOJ9L/Kk=0000 |
| Ma Taiwan | 20111109001B1 | Taiwan Compatriot Permit | fe8725e3176da68fef7819fe49aa34ff5 5e402184aae90f09d001f9ec0ab14ccb 964a0d4267cb6badc64792811dd395 af5b011998576969e6c66af72fdb57ee c18611981873742d4633c965f393c08 4ffc14b05fde54ecd420dffdc37b64f4 8c905c693439d95b2b0c0ef3b23aa3d 1d3d00022b411bfcab032149481ba59 6a2f | MsqxgvK0H 0eEJIhCScSd k/p302VxAW 4vTxggun7lc bQ= | 01MsqxgvK0H0 eEJIhCScSdk/p3 02VxAW4vTxg gun7lcbQ=0000 |
| Toams Welly | 0012003496 | Foreign Passports | c75f20adfe1667788d8bf6d5fd21f516 7c223333978a1773dd7b72cf2c4945e a5c41058f353519340342d5a9bf21e0 8f531320a4c9b6a3d47a16806df8ec9f 301ce0a93f3620066f8fdef5a5eef968 a84529026c5e100b36a6c53f244e15b a413f03a64b0752f4738dc8d2446298 9e11ca057fc7a9e7af60593f45975ff9 a81b | OO0IddLON Kqx9FaMM NVOe+Lezj5 FbBB9R+m8 3ZwIbxE= | 01OO0IddLON Kqx9FaMMNV Oe+Lezj5FbBB9 R+m83ZwIbxE= 0000 |

TABLE 2-continued

The examples of the eID_code in different certificates

| Name | Identity number | Certificate type | 128-byte-long random number | Hash value | eID_code |
|---|---|---|---|---|---|
| Zhang Xiaoyan | 320825197708050414 | Identity Card | afb6ffe5f9d81efde84176ac6a013545 032c6943bb040a470f8abbed1624060 dd448e72d4e89279a52ea495f0181ea e48c3d8ea3ea6452859a10d720a5da4 60b5a8b854b537d4f63374fadbaab1f 690c33e76ed79dc1b1972c9266a047a b16596dee9827f3b783196e27b1f611 a400675250ac4967f85a33d8caa08e3 05fd10b | OhUWaitCZc ZJGcIOnyuC EFlIr+M4yaIr JhAck7r8ZtE= | 01OhUWaitCZc ZJGcIOnyuCEFl Ir+M4yaIrJhAck 7r8ZtE=0000 |
| Wa Wa | A123456 | Other Certificates | 1c59667dae08acc68d8346b38c3f325 3da566129aeeb337487dcaf91bee60a 13335666cc6e3e485332d777e44e0e9 98163baed9b19c319aea79edf9df5f7d c0937d1043644ecad0a215ac87e709d b534a142bf59fb467df6d828c1764b3 1459d31e1dbf5595ae9999ede7e3fe6 70f82a25e44612c91ffc3ce08411f920 f8fl7b | 1BJr2YYeh5 qKfMcoOAF A+Q6kixydg E/ng8UoKbT l8Sg= | 011BJr2YYeh5q KfMcoOAFA+Q 6kixydgE/ng8Uo KbTl8Sg=0000 |

For the convenience of description, the computational formula of the eID_code is illustrated with the following formula (1) and (2). The implementation steps to generate the eID_code are illustrated with the FIG. 1. The steps of data consistency checking in the card are illustrated with the FIG. 2.

The computational formula of the eID_code is as follows:

| eID_version | BHash_Value | eid_code_rvb |
|---|---|---|

$$BHash\_Value = Base_{64}\{(SM3|SHA256)[append \\ (IDnumber\|name\|type\|random\_eid\_hash)]\} \quad (1)$$

$$eID\_code = append \\ (eID\_version\|Hash\_Value\|eID\_code\_rvb) \quad (2)$$

The steps to generate the network identity identification code (eID_code) are as follows:

(1) Initialization, generating a 128-byte-long random number through the true random number generator (TRNG), and assigning the value to the string type variable random_eid_hash to generate the 3-byte-long reservation byte eid_code_rvb with the string type, and its default is to be filled with 0;

(2) When receiving the request to generate a eID_code from the client, the server reading the version number eid_version, the user's identity number (IDnumber), the username (name) and the valid certificate types (type) from the request information;

(3) The server launching its audit procedures. If the audit is passed, then turning to step 4, otherwise informing the user of the information "failed audit and having applied for eID";

(4) Calling the connection function append( ), and making the string type variable Hash_origin=append(IDnumber, name, type, random_eid_hash);

(5) The Hash_origin being padded, iterated and compressed by SM3 (or SHA256 arithmetic) to generate a hash value of 32-byte-long binary information, and assigning the value to the Hash_Value, which is: Hash_Value= (SM3|SHA256)[Hash_origin];

(6) Encoding the Hash_card by Base64 coding to get a 44-byte-long string and assigning the value to the BHash_Value, which is BHash_Value=Base$_{64}$[Hash_Value];

(7) Calling the connection function append( ) to connect the eID_version, BHash_Value and eid_code_rvb, assigning the value to the eID_code, which is eID_code=append(eID_version, BHash_Value, eid_code_rvb);

(8) Returning the eID_code to the client. If the return information that the eID_code has been written successfully to the eID from the client is received, turning to the step 9, otherwise informing the client of the information "the eID_code is failed to generate";

(9) Storing the eID_code into the database, and informing the user of a message that the eID_code can be checked.

The steps of the eID_code checking data consistency in the network electronic identity are as follows:

(1) Initialization, reading the user's identity number (IDnumber), the username (name), the valid certificate types (type) and the 128-byte-long sequential file (card_sn);

(2) If the request of writing the eID_code in from the client is received in the card, then reading the BHash_Value and turning to step 3, otherwise waiting;

(3) Calling the connection function append, and making the string type variable Hash_origin=append (Idnumber, name, type, card_sn);

(4) The Hash_origin being padded, iterated and compressed by cryptographic hash algorithm SM3 (or SHA256) to generate a hash value of 32-byte-long binary information, and assigning the value to the Hash_card, which is:

Hash_card=(SM3|SHA256)[append (IDnumber|name|type|card_sn)];

(5) Coding the Hash_card by Base64 coding to get a 44-byte-long string and assigning the value to the BHash_card, which is BHash_card=Base$_{64}$[Hash_card];

(6) Activating the data consistency checking instruction eid_code_verify in the card, and performing checking between BHash_carda and BHash_Value. If the result is identical, agreeing to write the eID_code into the request. If not, refusing the request of writing eID_code in and informing the user of the information that "the request of writing eID_code in is wrong".

The above methods of the present invention could achieve the following features in the security and privacy protection aspects:

(1) Uniqueness

The identification code of the network electronic identity eID_code is generated according to the citizen's valid identity number, type, name and random number. It realizes the one-to-one correspondence between the eID_code and the citizenship. The 256-byte-long cryptographic hashing algorithm is used to ensure the uniqueness of the eID_code and internal data consistency checking instruction is used to ensure the uniqueness of the citizen's valid eID_code.

(2) Privacy

The eID_code itself doesn't include any user's identity information (such as the valid identity number, the type, the name and so on), which protects citizen's identity privacy information from being exposed.

(3) Irreversibility

The eID_code is generated by 256-byte-long hash cryptograph algorithm (national encryption SM3 or SHA256) and then is coded by Base64 coding. Because the inverse calculation of the hash cryptograph algorithm is not applicable, the Base64 coding will make the original information difficult to be identified. And because the 128-byte-long random number is introduced as a factor in the process of calculation, it is impossible to use brute force. Therefore, the generated eID_code is irreversibility.

(4) Replaceability

As the same with the fixed coding of the identity card number, once the correspondence relationship between the eID_code and the citizen's personal identity information is leaked, a new 128-byte-long random number will be generated through the citizen's individual application. The new eID_code will be calculated to replace the old one to keep protecting the user's privacy.

(5) Supporting Security Verification Inside the Card

The special cos instruction eid_code_verify is designed to realize the security verification in the card for the card owner's identity consistency. There is an online security verification process designed for the card owner's identity consistency.

By means of the method for generating and check-controlling a network identity identification code in a network electronic identification card, because the coding method is that the Base64 coding of the 32-byte-long binary information is calculated with the user's identity number, the username and the 128-byte-long random number string, according to the 256-byte-long cryptographic hashing algorithm (national encryption SM3 or SHA256), this coding method has the characteristics of uniqueness, low-cost calculation and irreversibility and achieves both the purposes of managing a network identity and privacy protection. At the same time, there is a one-to-one correspondence between the network identity identification code (eID_code), representing the identification code of citizenship corresponding to the eID, and the citizenship. The eID_code itself doesn't include any user's identity information, which ensures the personal identity authenticity and effectively protects the identity information from being exposed. On the other hand, the present invention analyzes all kinds of identity relevant information in the network identity management and service to give the unified rules of the eID_code coding method and to approve, exchange, preserve and manage the identity information. This is convenient to interconnect among the different identity service systems, and effectively protects the network application security and identity information privacy of citizens. The method is convenient and quick in use, has stable and reliable working performance, and has a wide application range, thereby laying a strong foundation for establishment of unified network identity management and service ecosystem.

In this specification, the present invention has been described with reference to specific embodiments. However, obviously modifications and variations still can be made without departing from the spirit and scope of the invention. Accordingly, the specification and drawings are to be regarded as illustrative rather than restrictive.

We claim:

1. A method for generating and check-controlling a network identity identification code in a network electronic identity, in which the network electronic identity is connected with a server through a client, comprising:
    a microprocessor;
    the server performing initialization, and performing generation and distribution of random numbers in advance;
    the server receiving a request from a client to generate a network identity identification code, and extracting the user's identity information from this;
    the server auditing and processing the identity information;
    if the auditing is not passed, then performing information tips and exiting;
    if the auditing is passed, then performing encryption and coding to achieve a coded value according to the identity information and the corresponding random number;
    the server generating a network identity identification code according to the coded value, and sending the network identity identification code to the network electronic identity through the client;
    the network electronic identity receiving the request of writing the network identity identification code in transmitted by the client to perform the check processing operation of the network identity identification code, and feeding back a result to the server through the client;
    the server judging whether it receives the information that the network identity identification code has been successfully written into the network electronic identity sent by the client;
    if it is not received, then performing information error tips and exiting;
    if it is received, the server storing the network identity identification code into a database, and informing the user; and
    the server receiving the identity information of the user who holds the network electronic identity and establishing the corresponding relationship between the identity information and the random number, wherein the microprocessor performs computations associated with the method.

2. The method for generating and check-controlling a network identity identification code in a network electronic identity according to claim 1 characterized in that, performing generation and distribution of random numbers in advance comprises:
    the server generating the random numbers through a true random number generator (TRNG); and
    the server using the random numbers as the serial number information of the card to be directly written into the corresponding network electronic identity.

3. The method for generating and check-controlling a network identity identification code in a network electronic identity according to claim 2 characterized in that, the random number is 128 bytes long.

4. The method for generating and check-controlling a network identity identification code in a network electronic identity according to claim 2 characterized in that, the user's identity information comprises at least one of a version number of the network identity identification code, a user's identity number, a username and one or more valid certificate types.

5. The method for generating and check-controlling a network identity identification code in a network electronic identity according to claim 4 characterized in that, the one or more valid certificate types comprise at least one of a the resident identity card, a household register, a passport, an army identity card, a soldier license, an officers card, an Exit-Entry Permit (the Two-way Permit), a compatriot permit, foreign passports, and other certificates.

6. The method for generating and check-controlling a network identity identification code in a network electronic identity according to claim 1 characterized in that, auditing and processing the identity information comprise:

the server judging whether the identity information has generated the corresponding valid network identity identification code;

if yes, then returning the failed audit result;

if not, then returning the successful audit result.

7. The method for generating and check-controlling a network identity identification code in a network electronic identity according to claim 1 is characterized in that, performing information tips includes:

an information tip, "the user's audit is failed and has applied for a network identity identification code", being sent to the user.

8. The method for generating and check-controlling a network identity identification code in a network electronic identity according to claim 4 characterized in that, the server performing an encryption algorithm and coding to achieve a coded value comprises:

producing an original string according to the following formula:

Original string=append (user's identity number, username, valid certificate types and random number), in which the append is the string concatenation operator;

getting a hash value by padding, iterating and compressing the original string with the default encryption algorithm;

getting a coded value by coding the hash value with a default coding rule.

9. The method for generating and check-controlling a network identity identification code in a network electronic identity according to claim 8 characterized in that, the encryption algorithm is SM3 cryptographic hash algorithm or SHA256 encryption algorithm.

10. The method for generating and check-controlling a network identity identification code in a network electronic identity according to claim 8 characterized in that, the hash value is a piece of 32-byte-long binary information.

11. The method for generating and check-controlling a network identity identification code in a network electronic identity according to claim 8 characterized in that, the coding rule is Base64 coding.

12. The method for generating and check-controlling a network identity identification code in a network electronic identity according to claim 11 characterized in that, the coded value is a 44-byte-long string.

13. The method for generating and check-controlling a network identity identification code in a network electronic identity according to claim 4 characterized in that, generating a network identity identification code according to the coded value includes:

generating a network identity identification code according to the following formula:

Network identity identification code=append (version number of the network identity identification code, coded value, reservation byte), in which the append is a string concatenation operator.

14. The method for generating and check-controlling a network identity identification code in a network electronic identity according to claim 13 characterized in that, the reservation byte is a 3-byte-long string, and its default is 0.

15. The method for generating and check-controlling a network identity identification code in a network electronic identity according to claim 8 characterized in that, the check processing operation of the network identity identification code comprises the following steps:

the electronic identity performing initialization and reading the user's identity information and the serial number information of the card;

the network electronic identity judging in real time whether it receives the request sent by the client of writing the network identity identification code where;

if not, then repeating the network electronic identity judging in real time whether it receives the request sent by the client of writing the network identity identification code;

if yes, then reading the coded value of the network identity identification code, and performing encryption and coding to get a coded value of the card according to the user's identity information and the serial number information of card; and the network electronic identity performing consistency checking between the coded value and the coded value of card;

if the checking is passed, writing the network identity identification code in and returning the result that the network identity identification code is successfully written in; if the checking is not passed, then returning directly the result that the network identity identification code is failed in being written in.

16. The method for generating and check-controlling a network identity identification code in a network electronic identity according to claim 15 characterized in that, performing encryption and coding to get the coded value of the card comprises the following steps:

producing an original string of the card according to the following formula:

Original string of the card=append (user's identity number, valid certificate types and the serial number information of card), in which the append is the string concatenation operator;

getting the hash value of the card by padding, iterating and compressing the original string of the card with the default encryption algorithm of the card;

getting a coded value of the card by coding the hash value of the card with the default coding rule of the card.

17. The method for generating and check-controlling a network identity identification code in a network electronic identity according to claim 16 characterized in that, the default encryption algorithm of the card is SM3 cryptographic hash algorithm or SHA256 encryption algorithm.

18. The method for generating and check-controlling a network identity identification code in a network electronic identity according to claim 16 characterized in that, the hash value of the card is a piece of 32-byte-long binary information.

19. The method for generating and check-controlling a network identity identification code in a network electronic identity according to claim 16 characterized in that, the default coding rule of the card is Base64 coding.

20. The method for generating and check-controlling a network identity identification code in a network electronic identity according to claim 16 characterized in that, the coded value of the card is a 44-byte-long string.

21. The method for generating and check-controlling a network identity identification code in a network electronic identity according to claim 15 characterized in that, performing consistency checking comprises:

the network electronic identity performing bit comparison between the coded value and the coded value of the card;
if the bit comparisons are fully identical with each other, then returning the successful audit result; and
if the bit comparisons are not fully identical, then returning the failed audit result.

22. The method for generating and check-controlling a network identity identification code in a network electronic identity according to claim 1 characterized in that, performing information error tips includes:

the server sending information tips, "the network identity identification is failed to be generated" to the client.

\* \* \* \* \*